United States Patent
Anandh et al.

(10) Patent No.: US 10,866,885 B2
(45) Date of Patent: Dec. 15, 2020

(54) PROGRAMMATICALLY GENERATING SOFTWARE TEST LIBRARIES FOR FUNCTIONAL SAFETY

(71) Applicant: Intel Corporation, Santa Clara, CA (US)

(72) Inventors: Krishnan Anandh, Fremont, CA (US); Richard Bousquet, Chandler, AZ (US); Vyasa Sai, Folsom, CA (US); Andrea Kroll, Pleasanton, CA (US); Mauro Pipponzi, Agrate Brianza (IT)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/370,077

(22) Filed: Mar. 29, 2019

(65) Prior Publication Data
US 2019/0227915 A1    Jul. 25, 2019

(51) Int. Cl.
| | | |
|---|---|---|
| G06F 11/36 | (2006.01) | |
| G06F 8/40 | (2018.01) | |
| G06F 8/75 | (2018.01) | |
| G06F 30/331 | (2020.01) | |
| G06F 8/41 | (2018.01) | |
| G06F 30/20 | (2020.01) | |
| G06F 30/33 | (2020.01) | |
| G06F 117/08 | (2020.01) | |

(52) U.S. Cl.
CPC ............ *G06F 11/3684* (2013.01); *G06F 8/40* (2013.01); *G06F 8/75* (2013.01); *G06F 11/3664* (2013.01); *G06F 11/3676* (2013.01); *G06F 30/331* (2020.01); *G06F 8/433* (2013.01); *G06F 30/20* (2020.01); *G06F 30/33* (2020.01); *G06F 2117/08* (2020.01)

(58) Field of Classification Search
CPC ..... G06F 11/3684; G06F 30/331; G06F 30/20
USPC .................................................. 717/120–135
See application file for complete search history.

(56) References Cited

U.S. PATENT DOCUMENTS

| | | | |
|---|---|---|---|
| 7,085,702 B1* | 8/2006 | Hwang | G06F 30/30 703/15 |
| 7,716,473 B1* | 5/2010 | Kraemer | H04L 63/20 703/6 |
| 2004/0225459 A1* | 11/2004 | Krishnaswamy | G01R 31/3183 702/57 |
| 2014/0245088 A1* | 8/2014 | Torrecampo | G01R 31/318307 714/718 |
| 2015/0309813 A1* | 10/2015 | Patel | G06F 9/455 703/22 |

(Continued)

OTHER PUBLICATIONS

Antoniol, Giuliano, and Massimiliano Di Penta. "Library miniaturization using static and dynamic information." International Conference on Software Maintenance, 2003. ICSM 2003. Proceedings.. IEEE, 2003.pp. 1-10 (Year: 2003).*

(Continued)

*Primary Examiner* — Satish Rampuria
(74) *Attorney, Agent, or Firm* — Jordan IP Law, LLC

(57) ABSTRACT

Methods, systems and apparatuses may provide for technology that applies a functional safety test stimulus to a hardware level simulator, automatically compiles an output of the hardware level simulator into a software test library (STL), and iteratively verifies that the diagnostic coverage of the STL file approximates the diagnostic coverage of the functional safety test stimulus.

16 Claims, 5 Drawing Sheets

(56) References Cited

U.S. PATENT DOCUMENTS

2018/0349259 A1* 12/2018 Mariani ............... G06F 11/008
2019/0250969 A1*  8/2019 Tan .................... G06F 11/0751

OTHER PUBLICATIONS

Mirshokraie, Shabnam, Ali Mesbah, and Karthik Pattabiraman. "JSeft: Automated JavaScript unit test generation." 2015 IEEE 8th International Conference on Software Testing, Verification and Validation (ICST). IEEE, 2015.pp. 1-10 (Year: 2015).*

Delp, Scott L., et al. "OpenSim: open-source software to create and analyze dynamic simulations of movement." IEEE transactions on biomedical engineering 54.11 (2007): pp. 1940-1950. (Year: 2007).*

Floridia, Andrea, Ernesto Sanchez, and Matteo Sonza Reorda. "Fault grading techniques of software test libraries for safety-critical applications." IEEE Access 7 (2019): pp. 63578-63587. (Year: 2019).*

Rogovchenko-Buffoni, Lena, et al. "An integrated toolchain for model based functional safety analysis." Journal of Computational Science 5.3 (2014): pp. 408-414. (Year: 2014).*

Liu, Jing, et al. "Functional safety certification: Practice and issues." 2008 IEEE International Conference on Automation Science and Engineering. IEEE, 2008.pp. 412-417 (Year: 2008).*

* cited by examiner

PROGRAMMATICALLY GENERATING SOFTWARE TEST LIBRARIES FOR FUNCTIONAL SAFETY

TECHNICAL FIELD

Embodiments generally relate to functional safety testing. More particularly, embodiments relate to programmatically generating software test libraries for functional safety.

BACKGROUND

Functional safety is an area of concern in autonomous platforms due to the unmanned nature of the platforms and the potential risk that the platforms present to end users. To ensure functional safety, a software test library (STL) may be used to test for the presence of faults in a platform at startup and during run-time. The creation of STLs, however, may involve a computer programmer manually writing the STL. Indeed, the manual process may involve experimental system analysis, coverage testing, and so forth. Accordingly, conventional solutions to creating STLs may suffer from relatively high overhead and ambiguity.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
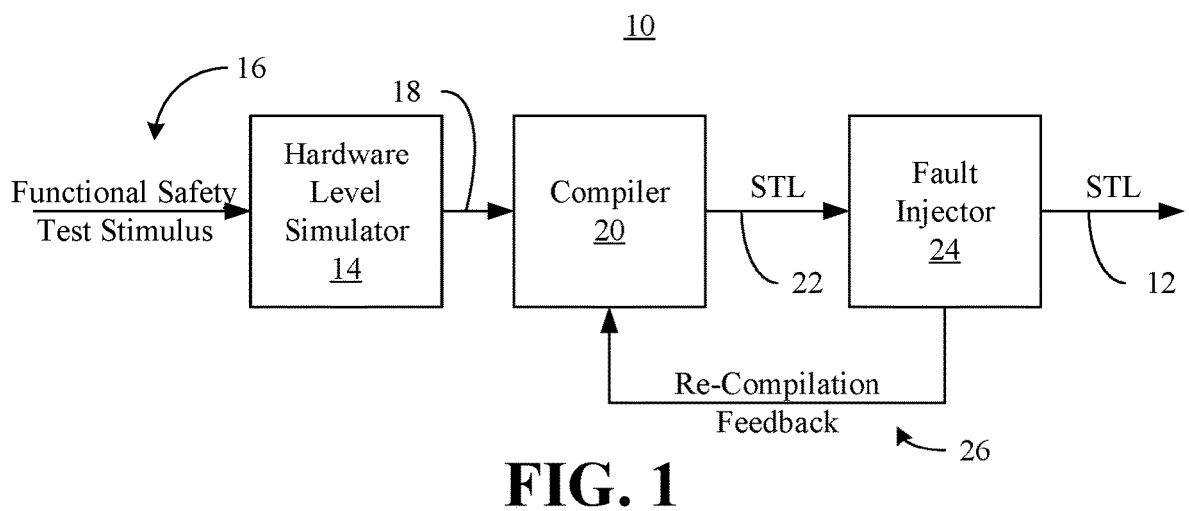
FIG. 1 is a block diagram of an example of a computing architecture according to an embodiment.

FIG. 1 shows a closed loop computing architecture 10 that may be used to programmatically generate a deployment STL file 12 having a targeted diagnostic coverage. In the illustrated example, a hardware system is emulated by a hardware level simulator 14 (e.g., Verilog Logic Simulator running a register transfer level/RTL or "IP block" level gate model of the hardware system). The hardware system might be part of an autonomous platform (e.g., vehicle, robot, drone) having functional safety concerns and/or requirements. In the illustrated example, a functional safety test stimulus 16 (e.g., instruction stream file that is an existing verification test stimulus with high diagnostic coverage) is supplied to the hardware level simulator 14, which generates an output 18. As will be discussed in greater detail, the output 18 of the hardware level simulator 14 may include a memory trace file, a coverage file (e.g., code and/or toggle coverage), an enhanced value change dump (EVCD) file, and so forth.

In the illustrated example, a compiler 20 automatically compiles the output 18 of the hardware level simulator 14 into an intermediate STL file 22. In general, the compiler 20 adaptively optimizes the intermediate STL file 22 for code density, latency and diagnostic coverage. The intermediate STL file 22 and at least a portion of the output 18 may be passed to a fault injector 24, wherein the fault injector 24 determines the diagnostic coverage (DC) of the intermediate STL file 22. In an embodiment, an adjusted cost function is provided to the compiler 20 as re-compilation feedback 26 and the compiler 20 re-compiles the output 18 of the hardware level simulator 14 based on the feedback 26. Once the intermediate STL file 22 meets the diagnostic coverage requirements, the deployment STL file 12 is output and used to test for the presence of faults (e.g., permanent faults such as bad transistors and/or transient faults resulting from phenomena such as cosmic rays) in the hardware system at startup and during run-time (e.g., on an interval basis). Automatically generating the deployment STL file 12 enhances performance by reducing overhead (e.g., experimental system analysis and/or floating point testing) in the creation of the STL file 12 and reducing overhead in the deployment STL file 12 at a known diagnostic coverage.

Figure 2:
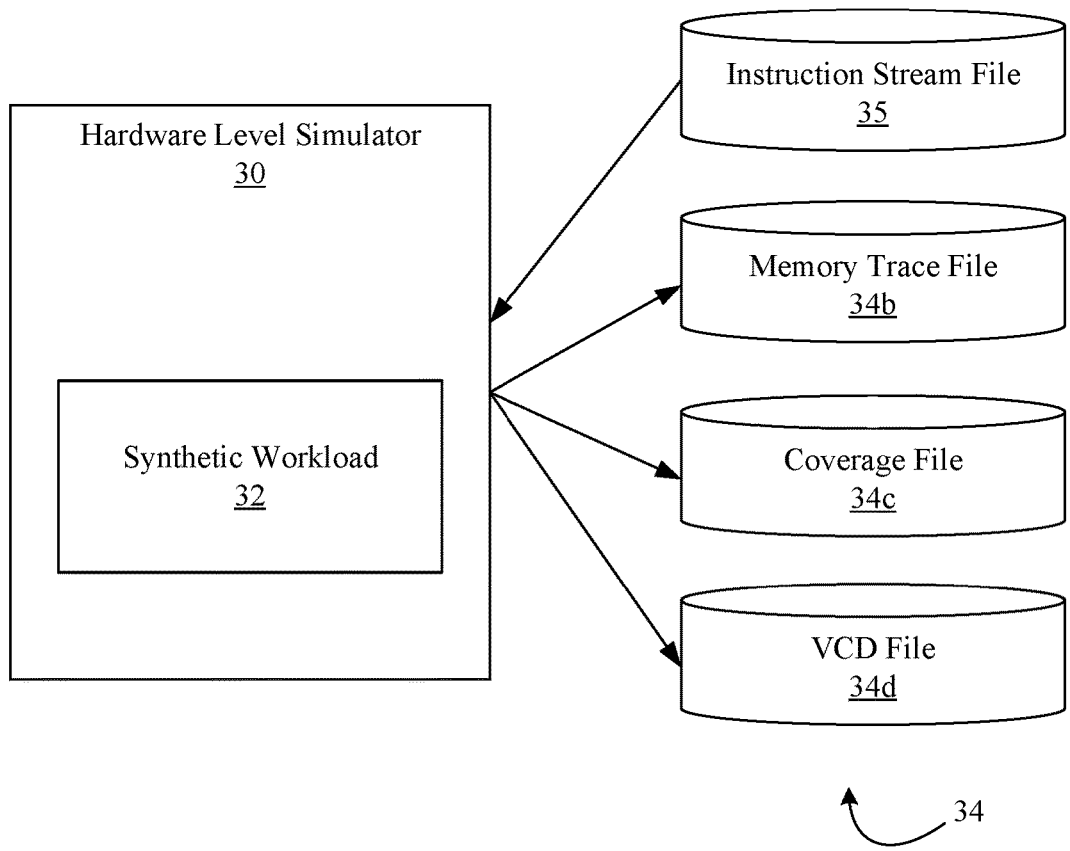
FIG. 2 is a block diagram of an example of an output generated using functional safety tests during hardware validation according to an embodiment

FIG. 2 shows a hardware level simulator 30 that receives an instruction stream file 35 (e.g., a binary large object/blob representing a functional safety test stimulus) and executes a synthetic workload 32. The hardware level simulator 30, which may be readily substituted for the hardware level simulator 14 (FIG. 1), emulates a hardware system having functional safety concerns and/or requirements. In the illustrated example, an output 34 (34a-34c) of the simulator 30 includes a memory trace file 34b, a coverage file 34c (e.g., code/toggle coverage), and an EVCD file 34d. In an embodiment, the instruction stream file 34a is an Aub file, the coverage file 34c indicates the diagnostic coverage of the synthetic workload 32, and the EVCD file 34d includes signal strength and directionality data.

Figure 3:
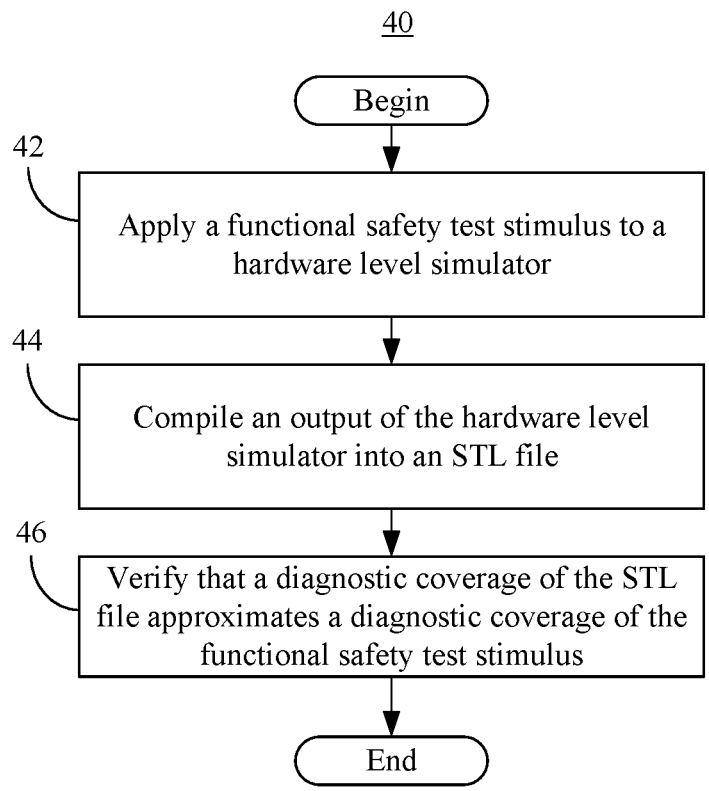
FIG. 3 is a flowchart of an example of a method of programmatically identifying the diagnostic coverage of STLs according to an embodiment.

FIG. 3 shows a method 40 of programmatically generating STLs. The method 40 may generally be implemented in a computing architecture such as, for example, the architecture 10 (FIG. 1), already discussed. More particularly, the method 40 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 40 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 4:
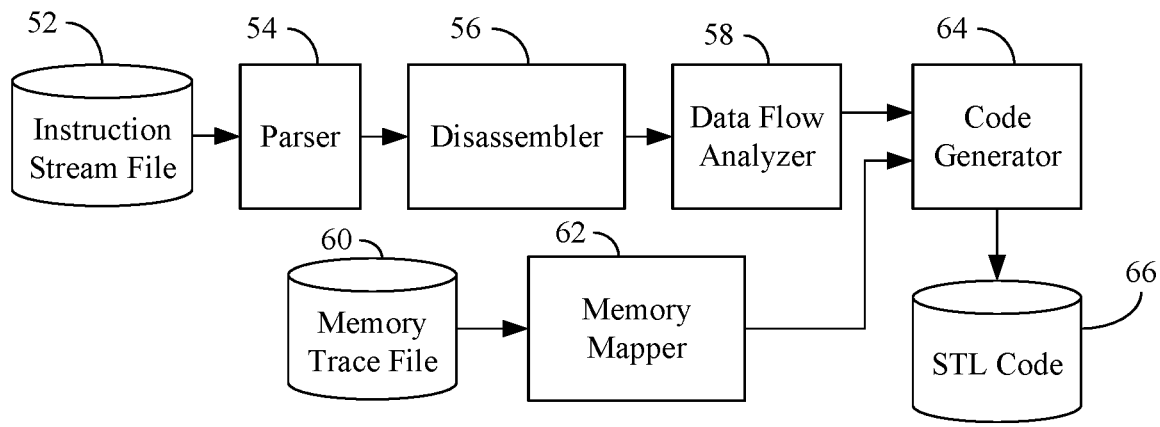
FIG. 4 is a block diagram of an example of a compiler and optimizer according to an embodiment.

Illustrated processing block 42 provides for applying a functional safety test stimulus to a hardware level simulator, wherein an output of the hardware level simulator is compiled into an STL file at block 44. Block 46 verifies that a diagnostic coverage of the STL file approximates (e.g., encompasses, is greater than or equal to, matches and/or mirrors) the diagnostic coverage of the functional safety test stimulus. The illustrated method 40 enhances performance by reducing overhead in the creation of the STL file and reducing overhead in the STL file itself FIG. 4 shows a compiler 50 that may be readily substituted for the compiler 20 (FIG. 1), already discussed. In the illustrated example, a parser 54 receives an instruction stream file 52 (e.g., blob from a hardware level simulator) and extracts an opcode stream from the instruction stream file. In an embodiment, the parser 54 generates an abstract syntax tree (AST) to extract the opcode stream. A disassembler 56 may receive the opcode stream from the parser 54 and translate the bits of the opcode stream into assembly code. Additionally, a data flow analyzer 58 generates one or more flow graphs (e.g., control flow graphs and/or data flow graphs) based on the assembly code. In general, the flow graph(s) reconstruct functional blocks of sequential code in the functional safety test stimulus that was input to the hardware level simulator. More particularly, the optimized AST may be converted to an intermediate representation (IR). In such a case, multiple passes of optimizations on the IR are performed including copy propagation, dead code elimination, and local, global and inter-procedural optimizations using control flow graphs (CFGs). In an embodiment, the data flow analyzer 58 uses a multi-variate cost function to optimize the DC, while minimizing the cycle count and guiding the IR optimizations of the compiler 50.

As already noted, the output of the hardware level simulator may also include a memory trace file 60. Accordingly, the illustrated compiler 50 also includes a memory mapper 62 that assigns pointer values and performs relative addressing (e.g., with index register offsets) based on the memory trace file 60. Additionally, a code generator 64 may generate STL code 66 based on the flow graph(s) from the data flow analyzer 58 and the output of the memory mapper 62.

Figure 5:
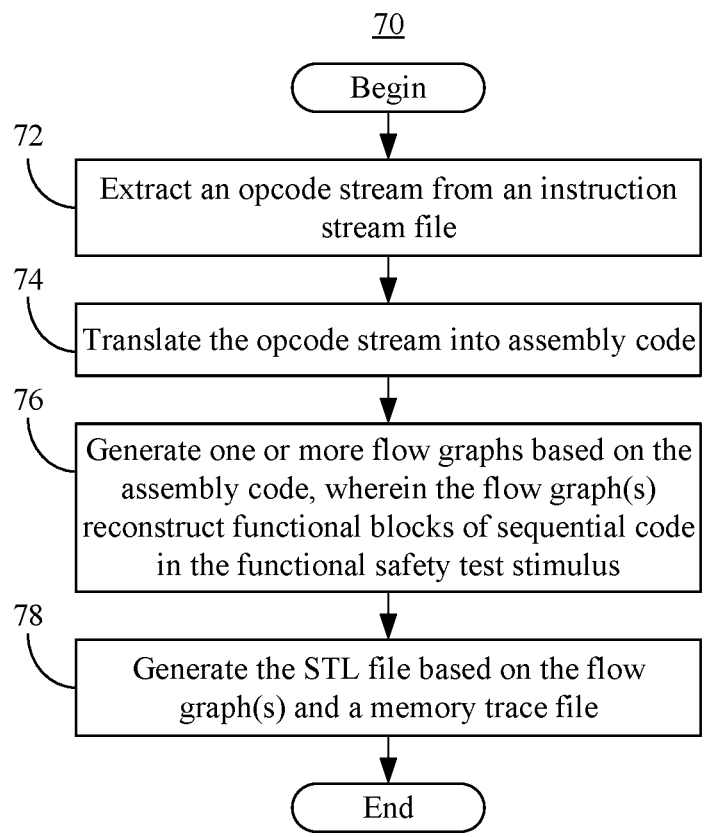
FIG. 5 is a flowchart of an example of a method of compiling the output of a hardware level simulator during functional safety testing into an STL according to an embodiment.

FIG. 5 shows a method 70 of compiling the output of a hardware level simulator into an STL file. The method 70, which may be readily incorporated into block 44 (FIG. 3), already discussed, may be conducted automatically by a compiler such as, for example, the compiler 20 (FIG. 1) and/or the compiler 50 (FIG. 4). Moreover, the method 70 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS, TTL technology, or any combination thereof.

Illustrated processing block 72 provides for extracting an opcode stream from an instruction stream file. In an embodiment, block 72 includes generating an AST. In one example, the opcode stream is translated into assembly code at block 74. One or more flow graphs are generated at block 76 based on the assembly code, wherein the flow graph(s) reconstruct functional blocks of sequential code in the functional safety test stimulus. Additionally, the STL file may be generated at block 78 based on the flow graph(s) and a memory trace file.

Figure 6:
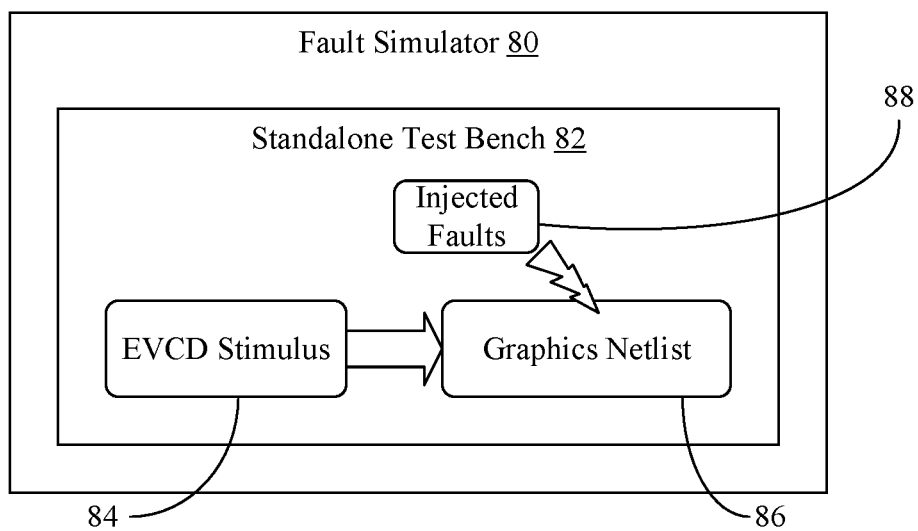
FIG. 6 is a block diagram of an example of a fault simulator according to an embodiment.

Turning now to FIG. 6, a fault simulator 80 is shown in which a standalone test bench 82 applies an EVCD stimulus 84 to a graphics netlist 86 that describes the connectivity of the hardware system. The test bed 82 may also inject the STL file into the stimulated graphics netlist 86 as one or more faults 88, which enables the diagnostic coverage of the STL file to be measured and/or determined.

Figure 7:
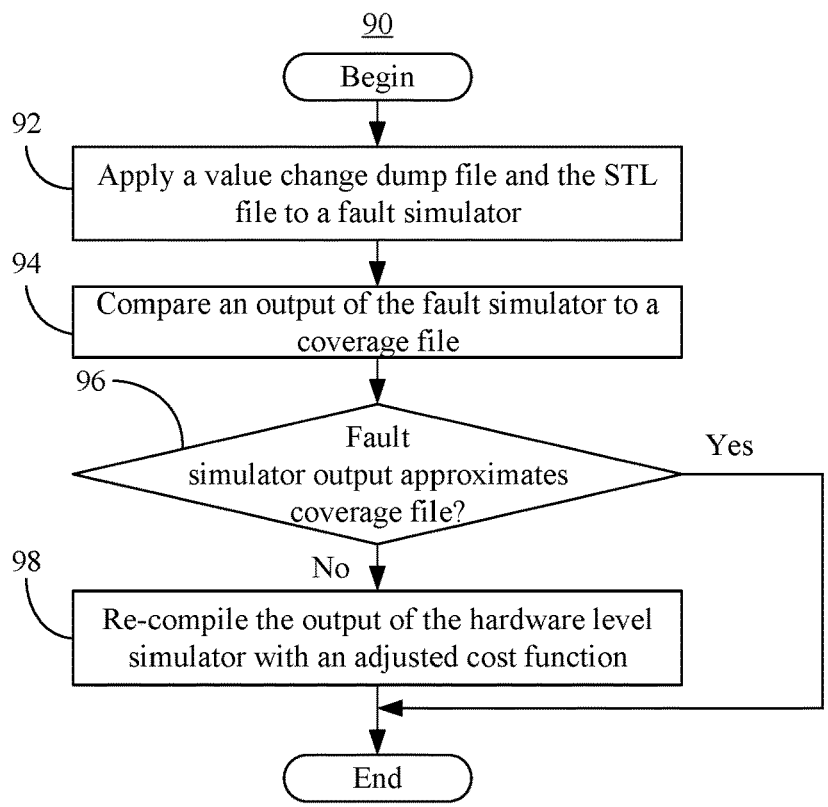
FIG. 7 is a flowchart of an example of a method of optimizing the diagnostic coverage of an STL according to an embodiment.

FIG. 7 shows a method 90 of verifying the diagnostic coverage of an STL file. The method 90, which may be readily incorporated into block 46 (FIG. 3), already discussed, may be conducted automatically by a computing architecture such as, for example, the architecture 10 (FIG. 1), already discussed. Moreover, the method 90 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS, TTL technology, or any combination thereof.

Illustrated processing block 92 applies an enhanced value change dump file and the STL file to a fault simulator, wherein the output of the fault simulator is compared to a coverage file at block 94. As already noted, the output of the fault simulator may indicate the diagnostic coverage of the STL file. Additionally, the coverage file may indicate the diagnostic coverage of the functional safety test stimulus. Accordingly, a determination may be made at block 96 as to whether the diagnostic coverage of the STL file approximates the diagnostic coverage of the functional safety test stimulus. Block 96 may include determining, for example, whether particular gates, blocks, circuits and/or portions of the hardware system are tested for failure (e.g., permanent and/or transient) similarly by both the STL file and the fault safety test stimulus at startup and/or run-time. If the fault simulator output does not meet or exceed the required diagnostic coverage, block 98 adjusts a cost function of the compiler in an adaptive process to meet the required diagnostic coverage.

In an embodiment, the cost function of the compiler has three components: a) code density cost (e.g., quantitative measure of the STL code generated from the AUB->STL compiler); b) latency cost (e.g., the amount of clock cycles that it takes to execute the STL code); and c) diagnostic coverage measure. During initial iterations of the adaptive loop, the weights for component a) and component b) may dominate over the weight of component c). Until the desired diagnostic coverage is achieved, the iterative process is repeated. In each iteration, the weight for component c) may be updated as follows:

$$\text{Weight(iteration number } i+1) = \text{alpha} * \text{Weight(iteration number } i)$$

Where alpha is a real number greater than 1.0, that is updated based on a schedule which grows with the number of iterations. A simple geometric schedule may be chosen for updating alpha as iterations progress forward.

In an embodiment, block 98 therefore includes initiating and/or repeating the method 70 (FIG. 5), already discussed, with the adjusted cost function as an input. As a result, the compiler is iteratively guided to produce better diagnostic coverage. If it is determined at block 96 that the output of the fault simulator approximates the coverage file, the illustrated method 90 terminates.

Figure 8:
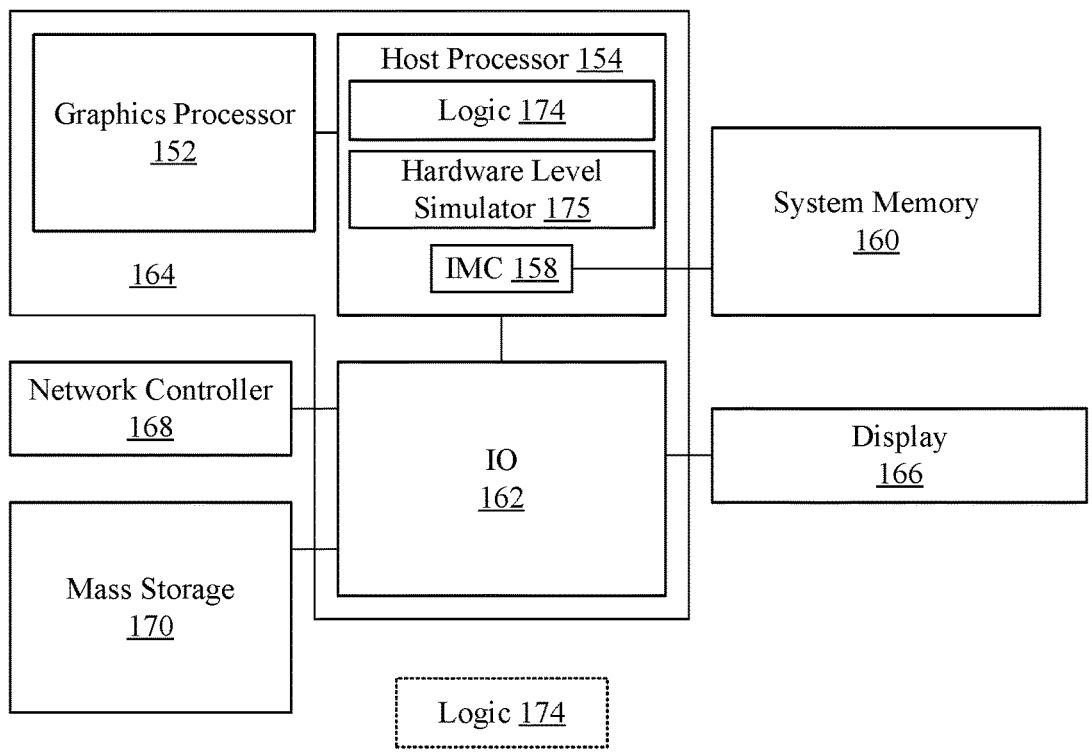
FIG. 8 is a block diagram of an example of a computing system according to an embodiment.

FIG. 8 shows a computing system 150 that may generally be part of an electronic device/system having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof In the illustrated example, the system 150 includes a graphics processor 152 (e.g., graphics processing unit/GPU) and a host processor 154 (e.g., central processing unit/CPU) having an integrated memory controller (IMC) 158 that is coupled to a system memory 160.

Additionally, the illustrated system 150 includes an input output (IO) module 162 implemented together with the host processor 154, and the graphics processor 152 on an SoC 164 (e.g., semiconductor die). In one example, the IO module 162 communicates with a display 166 (e.g., touch screen, liquid crystal display/LCD, light emitting diode/LED display), a network controller 168 (e.g., wired and/or wireless), and mass storage 170 (e.g., hard disk drive/HDD, optical disk, solid state drive/SSD, flash memory).

The illustrated host processor 154 includes a hardware level simulator 175 and logic 174 (e.g., logic instructions, configurable logic, fixed-functionality hardware logic, etc., or any combination thereof) to perform one or more aspects of the method 40 (FIG. 3), the method 70 (FIG. 5) and/or the method 90 (FIG. 7), already discussed. The logic 174 may also be substituted for compiler 20 (FIG. 1) and the fault injector 24 (FIG. 1) of the closed loop architecture 10 (FIG. 1), already discussed. Thus, the logic 174 may apply a functional safety test stimulus to the hardware level simulator 175, compile an output of the hardware level simulator 175 into an STL file, and verify that a diagnostic coverage of the STL file approximates the diagnostic coverage of the functional safety test stimulus. The output of the hardware level simulator 175 may include an instruction stream file.

In an embodiment, the output of the hardware level simulator 175 includes an EVCD file and a coverage file, wherein verifying the diagnostic coverage of the STL file includes applying the EVCD file to a fault injector and comparing an output of the fault injector to the coverage file. In such a case, the compiler re-compiles the output of the hardware level simulator with an adjusted cost function if the output of the fault simulator does not approximate the coverage file. The illustrated system 150 therefore exhibits enhanced performance by reducing overhead in the creation of the STL file and reducing overhead in the STL file at a known diagnostic coverage. Although the logic 174 is shown in the host processor 154, the logic 174 may reside elsewhere in the system 150.

Figure 9:
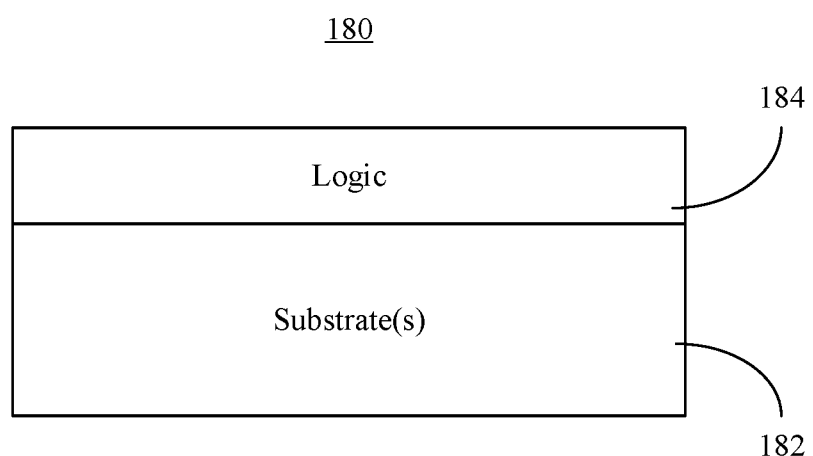
FIG. 9 is an illustration of an example of a semiconductor apparatus according to an embodiment.

FIG. 9 shows a semiconductor apparatus 180 (e.g., chip, die, package). The illustrated apparatus 180 includes one or more substrates 182 (e.g., silicon, sapphire, gallium arsenide) and logic 184 (e.g., transistor array and other integrated circuit/IC components) coupled to the substrate(s) 182. In an embodiment, the logic 184 implements one or more aspects of the method 40 (FIG. 3), the method 70 (FIG. 5) and/or the method 90 (FIG. 7), already discussed. Thus, the logic 184 may apply a functional safety test stimulus to a hardware level simulator, compile an output of the hardware level simulator into an STL file, and verify that a diagnostic coverage of the STL file approximates the diagnostic coverage of the functional safety test stimulus.

The logic 184 may be implemented at least partly in configurable logic or fixed-functionality hardware logic. In one example, the logic 184 includes transistor channel regions that are positioned (e.g., embedded) within the substrate(s) 182. Thus, the interface between the logic 184 and the substrate(s) 182 may not be an abrupt junction. The logic 184 may also be considered to include an epitaxial layer that is grown on an initial wafer of the substrate(s) 182.

ADDITIONAL NOTES AND EXAMPLES

Example 1 includes a performance-enhanced computing system comprising a network controller, a processor coupled to the network controller, and a memory coupled to the processor, the memory including instructions, which when executed by the processor, cause the computing system to apply a functional safety test stimulus to a hardware level simulator representing a performance-enhanced computer system, compile an output of the hardware level simulator into a software test library (STL) file, and verify a diagnostic coverage of the STL file.

Example 2 includes the computing system of Example 1, wherein the output of the hardware level simulator is to include an instruction stream file, and wherein to compile the output of the hardware level simulator, the instructions, when executed, cause the computing system to extract an opcode stream from the instruction stream file, translate the opcode stream into assembly code, and generate one or more flow graphs based on the assembly code, wherein the one or more flow graphs reconstruct functional blocks of sequential code in the functional safety test stimulus.

Example 3 includes the computing system of Example 2, wherein the output of- the hardware level simulator is to further include a memory trace file, and wherein to compile the output of the hardware level simulator, the instructions, when executed, further cause the computing system to generate the STL file based on the one or more flow graphs and the memory trace file.

Example 4 includes the computing system of Example 2, wherein to extract the opcode stream from the instruction stream file, the instructions, when executed, cause the computing system to generate an abstract syntax tree based on the instruction stream file.

Example 5 includes the computing system of any one of Examples 1 to 4, wherein the output of the hardware level simulator is to include an enhanced value change dump file and a coverage file that indicates the diagnostic coverage of the functional safety test stimulus, and wherein to verify the diagnostic coverage of the STL file, the instructions, when executed, cause the computing system to apply the extended value change dump file and the STL file to a fault simulator, wherein an output of the fault simulator indicates the diagnostic coverage of the STL file, and compare the output of the fault simulator to the coverage file.

Example 6 includes the computing system of Example 5, wherein the instructions, when executed, cause the computing system to re-compile the output of the hardware level simulator with an adjusted cost function if the diagnostic coverage of the STL file does not approximate the diagnostic coverage of the functional safety test stimulus.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to apply a functional safety test stimulus to a hardware level simulator, compile an output of the hardware level simulator into a software test library (STL) file, and verify that a diagnostic coverage of the STL file approximates a diagnostic coverage of the functional safety test stimulus.

Example 8 includes the semiconductor apparatus of Example 7, wherein the output of the hardware level simulator is to include an instruction stream file, and wherein to compile the output of the hardware level simulator, the logic is to extract an opcode stream from the instruction stream file, translate the opcode stream into assembly code, and generate one or more flow graphs based on the assembly code, wherein the one or more flow graphs reconstruct functional blocks of sequential code in the functional safety test stimulus.

Example 9 includes the semiconductor apparatus of Example 8, wherein the output of the hardware level simulator is to further include a memory trace file, and wherein to compile the output of the hardware level simulator, the logic is to generate the STL file based on the one or more flow graphs and the memory trace file.

Example 10 includes the semiconductor apparatus of Example 8, wherein to extract the opcode stream from the instruction stream file, the instructions, when executed, cause the computing system to generate an abstract syntax tree based on the instruction stream file.

Example 11 includes the semiconductor apparatus of any one of Examples 7 to 10, wherein the output of the hardware level simulator is to include an enhanced value change dump file and a coverage file that indicates the diagnostic coverage of the functional safety test stimulus, and wherein to verify the diagnostic coverage of the STL file, the logic is to apply the extended value change dump file and the STL file to a fault simulator, wherein an output of the fault simulator indicates the diagnostic coverage of the STL file, and compare the output of the fault simulator to the coverage file.

Example 12 includes the semiconductor apparatus of Example 11, wherein the logic is to re-compile the output of the hardware level simulator with an adjusted cost function if the diagnostic coverage of the STL file does not approximate the diagnostic coverage of the functional safety test stimulus.

Example 13 includes at least one computer readable storage medium comprising a set of instructions, which when executed by a computing system, cause the computing system to apply a functional safety test stimulus to a hardware level simulator, compile an output of the hardware level simulator into a software test library (STL) file, and verify that a diagnostic coverage of the STL file approximates a diagnostic coverage of the functional safety test stimulus.

Example 14 includes the at least one computer readable storage medium of Example 13, wherein the output of the hardware level simulator is to include an instruction stream file, and wherein to compile the output of the hardware level simulator, the instructions, when executed, cause the computing system to extract an opcode stream from the instruction stream file, translate the opcode stream into assembly code, and generate one or more flow graphs based on the assembly code, wherein the one or more flow graphs reconstruct functional blocks of sequential code in the functional safety test stimulus.

Example 15 includes the at least one computer readable storage medium of Example 14, wherein the output of the hardware level simulator is to further include a memory trace file, and wherein to compile the output of the hardware level simulator, the instructions, when executed, further cause the computing system to generate the STL file based on the one or more flow graphs and the memory trace file.

Example 16 includes the at least one computer readable storage medium of Example 14, wherein to extract the opcode stream from the instruction stream file, the instructions, when executed, cause the computing system to generate an abstract syntax tree based on the instruction stream file.

Example 17 includes the at least one computer readable storage medium of any one of Examples 13 to 16, wherein the output of the hardware level simulator is to include an enhanced value change dump file and a coverage file that indicates the diagnostic coverage of the functional safety test stimulus, and wherein to verify the diagnostic coverage of the STL file, the instructions, when executed, cause the computing system to apply the extended value change dump file and the STL file to a fault simulator, wherein an output of the fault simulator indicates the diagnostic coverage of the STL file, and compare the output of the fault simulator to the coverage file.

Example 18 includes the at least one computer readable storage medium of Example 17, wherein the instructions, when executed, cause the computing system to re-compile the output of the hardware level simulator with an adjusted cost function if the diagnostic coverage of the STL file does not approximate the diagnostic coverage of the functional safety test stimulus.

Example 19 includes a method comprising applying a functional safety test stimulus to a hardware level simulator, compiling an output of the hardware level simulator into a software test library (STL) file, and verifying that a diagnostic coverage of the STL file approximates a diagnostic coverage of the functional safety test stimulus.

Example 20 includes the method of Example 19, wherein the output of the hardware level simulator includes an instruction stream file, and wherein compiling the output of the hardware level simulator includes extracting an opcode stream from the instruction stream file, translating the opcode stream into assembly code, and generating one or more flow graphs based on the assembly code, wherein the one or more flow graphs reconstruct functional blocks of sequential code in the functional safety test stimulus.

Example 21 includes the method of Example 20, wherein the output of the hardware level simulator further includes a memory trace file, and wherein compiling the output of the hardware level simulator further includes generating the STL file based on the one or more flow graphs and the memory trace file.

Example 22 includes the method of Example 20, wherein extracting the opcode stream from the instruction stream file includes generating an abstract syntax tree based on the instruction stream file.

Example 23 includes the method of any one of Examples 19 to 22, wherein the output of the hardware level simulator includes an enhanced value change dump file and a coverage file that indicates the diagnostic coverage of the functional safety test stimulus, and wherein verifying the diagnostic coverage of the STL file includes applying the extended value change dump file and the STL file to a fault simulator, wherein an output of the fault simulator indicates the diagnostic coverage of the STL file, and comparing the output of the fault simulator to the coverage file.

Example 24 includes the method of Example 23, further including re-compiling the output of the hardware level simulator with an adjusted cost function if the diagnostic coverage of the STL file does not approximate the diagnostic coverage of the functional safety test stimulus.

Example 25 includes means for performing the method of any one of Examples 19 to 24.

Technology described herein therefore significantly reduces STL development effort and overhead for generated STLs. Additionally, the generated STL has measured hardware coverage that will run on the deployed platform. The libraries are of high value, particularly when they have known values for gate coverage associated with them.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
    a network controller;
    a processor coupled to the network controller; and
    a memory coupled to the processor, the memory including instructions, which when executed by the processor, cause the computing system to:
        apply a functional safety test stimulus to a hardware level simulator, the hardware level simulator to simulate a hardware system,
        compile an output of the hardware level simulator into a software test library (STL) file, and
        verify that a diagnostic coverage of the STL file approximates a diagnostic coverage of the functional safety test stimulus,
    wherein the output of the hardware level simulator is to include an instruction stream file, and wherein to compile the output of the hardware level simulator, the instructions, when executed, cause the computing system to:
        extract an opcode stream from the instruction stream file,
        translate the opcode stream into assembly code, and
        generate one or more flow graphs based on the assembly code, wherein the one or more flow graphs reconstruct functional blocks of sequential code in the functional safety test stimulus,
    wherein the output of the hardware level simulator is to further include a memory trace file, and wherein to compile the output of the hardware level simulator, the instructions, when executed, further cause the computing system to generate the STL file based on the one or more flow graphs and the memory trace file.

2. The computing system of claim 1, wherein to extract the opcode stream from the instruction stream file, the instructions, when executed, cause the computing system to generate an abstract syntax tree based on the instruction stream file.

3. The computing system of claim 1, wherein the output of the hardware level simulator is to include an enhanced value change dump file and a coverage file that indicates the diagnostic coverage of the functional safety test stimulus, and wherein to verify the diagnostic coverage of the STL file, the instructions, when executed, cause the computing system to:
    apply the extended value change dump file and the STL file to a fault simulator, wherein an output of the fault simulator indicates the diagnostic coverage of the STL file, and compare the output of the fault simulator to the coverage file.

4. The computing system of claim 3, wherein the instructions, when executed, cause the computing system to re-compile the output of the hardware level simulator with an adjusted cost function if the diagnostic coverage of the STL file does not approximate the diagnostic coverage of the functional safety test stimulus.

5. A semiconductor apparatus comprising:
    one or more substrates; and
    logic coupled to the one or more substrates, wherein the logic is implemented at least partly in one or more of configurable logic or fixed-functionality hardware logic, the logic coupled to the one or more substrates to:

apply a functional safety test stimulus to a hardware level simulator, the hardware level simulator to simulate a hardware system, compile an output of the hardware level simulator into a software test library (STL) file, and verify that a diagnostic coverage of the STL file approximates a diagnostic coverage of the functional safety test stimulus, wherein the output of the hardware level simulator is to include an instruction stream file, and wherein to compile the output of the hardware level simulator, the logic is to:

extract an opcode stream from the instruction stream file, translate the opcode stream into assembly code, and generate one or more flow graphs based on the assembly code, wherein the one or more flow graphs reconstruct functional blocks of sequential code in the functional safety test stimulus, wherein the output of the hardware level simulator is to further include a memory trace file, and wherein to compile the output of the hardware level simulator, the logic is to generate the STL file based on the one or more flow graphs and the memory trace file.

6. The semiconductor apparatus of claim 5, wherein to extract the opcode stream from the instruction stream file, the instructions, when executed, cause the computing system to generate an abstract syntax tree based on the instruction stream file.

7. The semiconductor apparatus of claim 5, wherein the output of the hardware level simulator is to include an enhanced value change dump file and a coverage file that indicates the diagnostic coverage of the functional safety test stimulus, and wherein to verify the diagnostic coverage of the STL file, the logic is to:

apply the extended value change dump file and the STL file to a fault simulator, wherein an output of the fault simulator indicates the diagnostic coverage of the STL file, and compare the output of the fault simulator to the coverage file.

8. The semiconductor apparatus of claim 7, wherein the logic is to re-compile the output of the hardware level simulator with an adjusted cost function if the diagnostic coverage of the STL file does not approximate the diagnostic coverage of the functional safety test stimulus.

9. At least one computer readable storage medium comprising a set of instructions, which when executed by a computing system, cause the computing system to:

apply a functional safety test stimulus to a hardware level simulator, the hardware level simulator to simulate a hardware system;

compile an output of the hardware level stimulator into a software test library (STL) file; and verify that a diagnostic coverage of the STL file approximates a diagnostic coverage of the functional safety test stimulus, wherein the output of the hardware level simulator is to include an instruction stream file, and wherein to compile the output of the hardware level simulator, the instructions, when executed, cause the computing system to:

extract an opcode stream from the instruction stream file;

translate the opcode stream into assembly code; and generate one or more flow graphs based on the assembly code, wherein the one or more flow graphs reconstruct functional blocks of sequential code in the functional safety test stimulus, wherein the output of the hardware level simulator is to further include a memory trace file, and wherein to compile the output of the hardware level simulator, the instructions, when executed, further cause the computing system to generate the STL file based on the one or more flow graphs and the memory trace file.

10. The at least one computer readable storage medium of claim 9, wherein to extract the opcode stream from the instruction stream file, the instructions, when executed, cause the computing system to generate an abstract syntax tree based on the instruction stream file.

11. The at least one computer readable storage medium of claim 9, wherein the output of the hardware level simulator is to include an enhanced value change dump file and a coverage file that indicates the diagnostic coverage of the functional safety test stimulus, and wherein to verify the diagnostic coverage of the STL file, the instructions, when executed, cause the computing system to:

apply the extended value change dump file and the STL file to a fault simulator, wherein an output of the fault simulator indicates the diagnostic coverage of the STL file; and compare the output of the fault simulator to the coverage file.

12. The at least one computer readable storage medium of claim 11, wherein the instructions, when executed, cause the computing system to re-compile the output of the hardware level simulator with an adjusted cost function if the diagnostic coverage of the STL file does not approximate the diagnostic coverage of the functional safety test stimulus.

13. A method comprising:

applying a functional safety test stimulus to a hardware level simulator, wherein the hardware level simulator simulates a hardware system;

compiling an output of the hardware level simulator into a software test library (STL) file; and verifying that a diagnostic coverage of the STL file approximates a diagnostic coverage of the functional safety test stimulus, wherein the output of the hardware level simulator includes an instruction stream file, and wherein compiling the output of the hardware level simulator includes:

extracting an opcode stream from the instruction stream file;

translating the opcode stream into assembly code; and generating one or more flow graphs based on the assembly code, wherein the one or more flow graphs reconstruct functional blocks of sequential code in the functional safety test stimulus, wherein the output of the hardware level simulator further includes a memory trace file, and wherein compiling the output of the hardware level simulator further includes generating the STL file based on the one or more flow graphs and the memory trace file.

14. The method of claim 13, wherein extracting the opcode stream from the instruction stream file includes generating an abstract syntax tree based on the instruction stream file.

15. The method of claim 13, wherein the output of the hardware level simulator includes an enhanced value change dump file and a coverage file that indicates the diagnostic coverage of the functional safety test stimulus, and wherein verifying the diagnostic coverage of the STL file includes:
  applying the extended value change dump file and the STL file to a fault simulator, wherein an output of the fault simulator indicates the diagnostic coverage of the STL file; and
  comparing the output of the fault simulator to the coverage file.

16. The method of claim 15, further including re-compiling the output of the hardware level simulator with an adjusted cost function if the diagnostic coverage of the STL file does not approximate the diagnostic coverage of the functional safety test stimulus.

* * * * *